Oct. 13, 1953     W. J. JACOBSSON     2,655,041

FLOWMETER

Filed Sept. 14, 1949

INVENTOR
WILGOT J. JACOBSSON
BY
D.C. Harrison
ATTORNEY

Patented Oct. 13, 1953

2,655,041

UNITED STATES PATENT OFFICE 2,655,041

FLOWMETER

Wilgot J. Jacobsson, Plainfield, N. J., assignor, by mesne assignments, to Union Carbide and Carbon Corporation, a corporation of New York Application September 14, 1949, Serial No. 115,678

7 Claims. (Cl. 73—199)

This invention relates to flowmeters of the type in which a float moves in a tapered transparent tube. An object is to enhance accuracy in the readings of a flowmeter of such type. Another object is to eliminate the usual noise incident to gas passing through a control valve when used with such a flowmeter and without resort to bulky or expensive sound muffling equipment. Yet another object is to simplify a flowmeter of the above type without impairing its usefulness.

An objection to the present practice in use of such flowmeters in hospitals, in connection with oxygen therapy apparatus, has been the noise incident to gas escaping from the control valve.

According to this invention the control valve has been placed on the downstream side of the aforesaid type of flowmeter when some usual fluid pressure regulator supplies a substantially fixed value of pressure to the flowmeter conveniently above atmospheric pressure. For oxygen therapy a convenient pressure on the flowmeter has been selected as fifty pounds per square inch. For use in welding in an atmosphere of inert gas such as argon, a convenient pressure of argon used on the flowmeter has been twenty pounds per square inch.

In an effort to eliminate objectionable noise resulting from gas discharging from a flowmeter valve when no substantial length of flexible tubing was used to absorb the sound, the problem was found to be difficult without resort to some usual type of sound muffling equipment. At first the muffling effect of a few layers of small mesh screen was tried when located in an outlet passage close to the control valve. But such an expedient was found to be inappropriate for its intended purpose. Another expedient tried was a layer of sintered metal particles often used as a filter. The precise reason for these expedients proving ineffective is not understood with certainty. It was thought that perhaps the short column of air in the base of the flowmeter on the downstream side of the control valve may resonate with a natural period of vibration somewhat after the manner of the vibration of a column of air in an organ pipe. It was then believed the solution lay in substantially filling the available length of air column with some gas permeable material in order to have a small pressure drop but yet be effective to shorten the air column to a length such that any vibration therein is above the audible sound range for the human ear. This solution proved satisfactory.

This invention is a continuation in part of my prior application, Serial No. 54,902, filed October 16, 1948, for Fluid Pressure Regulator.

Referring to the drawing.

Figure 2:
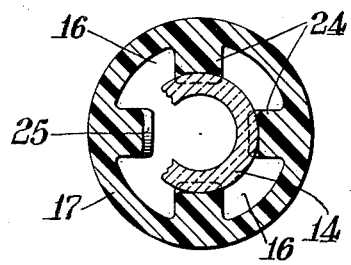
Fig. 2 is a section on the line 2—2 of Fig. 1.
Figure 3:
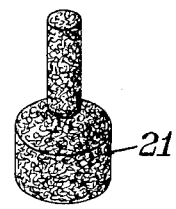
Fig. 3 is a perspective of the noise suppressing plug located on the downstream side of the control valve in the flowmeter base.

A supply connection 10 leads from some appropriate type of fluid pressure regulator and source of gas to the metal base 11 containing the passage 12 leading to below the flowmeter. As is customary, some usual type of fine mesh screen layers 13 function as a filter and distributor of the gas as it moves upward in the tapered inner glass tube 14. Some usual float such as the ball 32 illustrated, rises in the inner tube when its height varies according to the value of the gas flow, its height being readily readable from graduations 15 on the inner tube. As is usual in such flowmeters, the gas passes over the top of the inner tube and down a space 16 between the inner and outer tubes. In the present case the outer tube is made of a tough and strong transparent plastic material such as a polymethyl methacrylate known under the trade-name of "Lucite." A pair of passages 18 connect the space 16 with the control valve 19 in the base 11. An operating handle 20 is provided for convenience in adjusting the position of the valve 19. Between the valve 19 and the outlet connection 22 is a plug 21 of gas permeable material occupying the passage in which the plug is located. This plug 21 may be made of various materials so long as the pressure drop across it is small and so long as it is capable of filling the passage in which it is located. A preferred material found satisfactory for the plug 21 is a matted or compacted mass of bronze wire about six thousandths of an inch in diameter. A sintered metal plug of appropriate length and gas permeability would suffice, and the same is true of a plug formed of porous carbon, the controlling factor being large porosity and permeability to gas flow along with substantial length to fill the gas passage.

Figure 1:
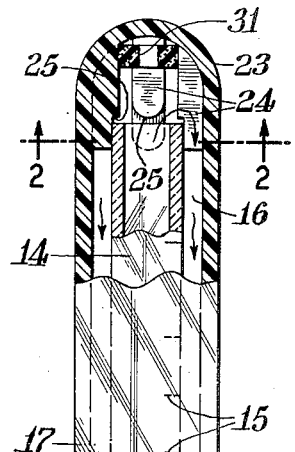
Fig. 1 is a longitudinal section through a preferred embodiment of this invention.

The outer tube 17 is structurally unitary and provided at its upper end with a hemispherical dome 23 to close the top of the tube and seal the same against any gas escaping. Ribs 24 project radially inwardly as shown in Figs. 1 and 2, far enough to engage and center the inner tube 14. A shoulder 25 is cut in these ribs to prevent any tendency for the inner tube to rise. This shoulder need not be contiguous the top of the inner tube, but as shown in the drawing, might be spaced slightly above it. An outer flange 26 surrounds the outer tube 17 and functions to compress the packing 27 when the outer tube threads 28 are fully engaged with their cooperating threads in the base 11. The ring 29 beneath the tube 17 is provided with a plurality of passages through which gas may flow from the space 16 into the passages 18. When the tube 17 is screwed into position the ring 29 presses against the packing ring 30, causing the ring 30 to expand and form a seal between passages 12 and 18 to prevent any gas from not passing through the flowmeter. This packing ring 30 also grips the inner tube 14 and prevents the inner tube from rising should there be any tendency for it to do so. A packing washer 31 is located in the upper portion of the outer tube between the ribs 24 for the purpose of functioning as a buffer or shock absorber in event the float 32 might rise into contact with this packing washer 31.

Among the advantages of this invention may be mentioned the enhanced accuracy in flowmeter reading due to the fact that substantially constant pressure is maintained on the flowmeter and such pressure is independent of the number of pieces of apparatus or equipment located on the downstream of the flowmeter so long as the control valve is also located on the downstream side of the flowmeter. The practice of having a control valve on the upstream side of the control meter does not insure a constant pressure on the flowmeter. Since flowmeters of the type illustrated are accurate only for one pressure on density of gas, variation in pressure on the flowmeter results in inaccurate readings. For oxygen therapy use in hospitals the plug 21 occupying most of the length of the passage between valve 19 and connection 22 is a satisfactory noise suppressor, is inexpensive, and adds no additional bulk, but can be located inconspicuously in the position illustrated. Another advantage of this invention over the prior art is the simplification in construction and elimination of parts.

Figure 4:
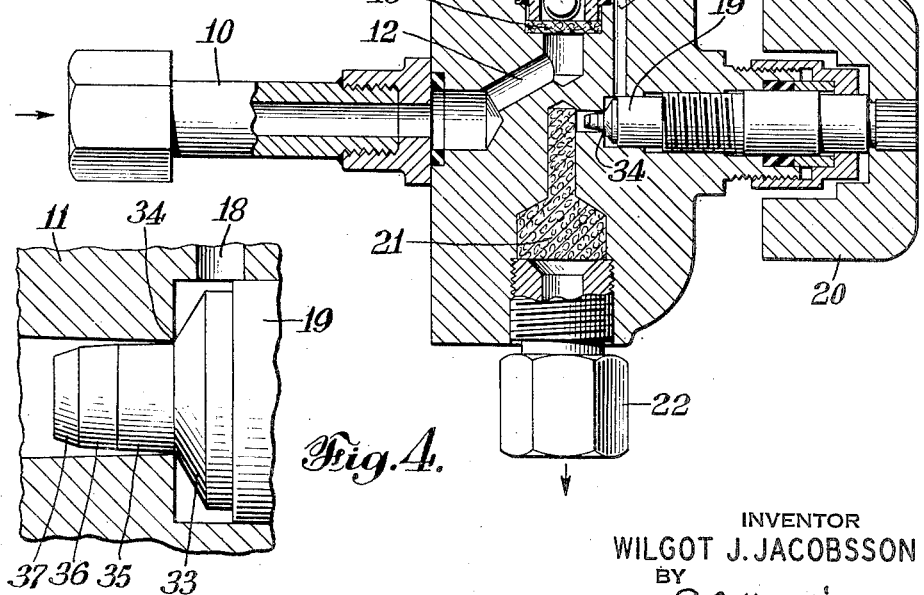
Fig. 4 is an enlarged view of the tapering end of the valve stem.

Heretofore on opening the valve at the flowmeter to control the flow, it has been difficult to obtain the regulation or control of flow to the degree desired because only a slight angular displacement of the valve has been needed to give as much flow as wanted. In other words with large changes in flow resulting from slight angular changes in the valve stem setting it has been difficult to avoid getting too much or too little gas and obtain the precise flow rate wanted. To overcome this difficulty the taper on the portion of the stem which is within the stationary seat when the valve is closed has been made to have the included angle increasing. More specifically in Fig. 4, the large diameter taper 33 engages the stationary valve element or seat 34. On opening the valve slightly by moving the tapered portion 33 away from the seat 34 a small amount, the very gradually tapered portion 35 is of use in enabling a larger angular displacement of the stem 19 to be made than has heretofore been possible before reaching the desired flow of gas. Taper 36 is steeper than the taper 35. These tapers have been made of such values that the angular displacement of the stem 19 is substantially proportional to the increase in flow of gas resulting from increasing the valve opening. They cause angular adjustment and flow to approximate a straight line relationship. The angle included by the taper 33, i. e. between the traces of a plane which includes the axis of the stem 19, is 120°. The included angle for taper 35 is 1° 47' and for taper 36 is 6° 22'. The taper 37 has an included angle of 37°. If the sides of a tapered or conical portion are extended to an apex then the angle between the opposite sides of the cone is their included angle. The portion 37 is as steeply tapered as is necessary for the purpose of obtaining a maximum flow. In a flowmeter valve for use in oxygen therapy the tapers 35 and 36 aid in enabling the valve to have approximately 2½ turns on opening to obtain usual flow of 15 liters of oxygen per minute. With the filter 21 in position approximately 5 turns of the valve give a maximum flow of 75 to 80 liters per minute and without the filter 21 in place 130 liters per minute are possible on the same movement of the stem 19.

What is claimed is:

1. In a flowmeter of the type having a float movable in a tapered tube, provided with a base having a fluid inlet therein, concentric spaced transparent tubes carried by said base, the inner concentric tube being provided with calibrations and connected with said inlet, said tubes providing an annular space between them connected at the top with the inside of the inner tube, and an outlet passage connected with said annular inter-tube space, the combination therewith of the improvement comprising the outer tube having an integral hemispherical upper end portion of the same material as the rest of said tube, ribs within and integral with said outer tube for centering and spacing the inner tube substantially coaxially within the outer tube.

2. A flowmeter according to claim 1, in which the outer tube is provided with an outside flange adjacent the lower end portion thereof, and packing between said flange and base.

3. A transparent plastic outer flowmeter tube comprising a hemispherical portion closing one end, the opposite end being threaded on the outside and provided above its threaded portion with an external peripheral flange, the closed end portion of said tube being provided on the inside with ribs for centering an inner tube.

4. A flowmeter of the type having a float movable in a tapered tube comprising a metal base, concentric transparent tubes projecting above the top of said base, said base having an inlet connection on a side of said base, and an outlet connection on the base substantially opposite and coaxial with said concentric tubes, a valve substantially opposite and coaxial with said inlet connection, there being an inclined inlet passage in the base leading from said inlet connection to the inner one of said concentric tubes, an outlet passage in the base generally parallel to the axis of said concentric tubes leading downward from between said tubes in substantial alinement with a wall of said outer tube, a coaxial outlet passage below said valve, and a short transverse passage in the base connecting said downward outlet passage with said coaxial outlet passage leading to said outlet connection, said valve being located at approximately the junction of said transverse and downward outlet passages.

5. A flowmeter according to claim 4, in which the outer one of said concentric transparent tubes is provided with screw threads at its lower end by means of which the same is secured in said metal base, said base having threads which engage said outer tube and having above its threads a coaxial enlarged recess, packing within said recess, and said outer tube having a flange on the outside adapted to compress said packing, and the top of said flange being adjacent the top surface of said base.

6. A flowmeter of the type having a float movable in a tapered tube, said flowmeter comprising a base having a fluid inlet passage, concentrically spaced transparent tubes carried by said base, the outer tube being closed at its upper end over the inner tube and provided with segments of outer tube material spacing and centering one tube with respect to the other, a float within the inner tube, at least one of said tubes being provided with graduations indicating the height of said float and the rate of fluid-flow therein.

7. In a base having a socket for receiving a flowmeter, a supply passage leading from one side of said base to said socket, an outlet passage leading from said socket to another side of said base, a control valve in said outlet passage, and an outlet connection for gas from said valve, the combination therewith of the improvement for reducing noise from gas passing said valve, said improvement including gas permeable material filling said outlet passage between said control valve and said connection to leave no vibrating column of gas giving a sound audible to the human ear.

WILGOT J. JACOBSSON.

References Cited in the file of this patent

UNITED STATES PATENTS

| Number | Name | Date |
|---|---|---|
| 963,643 | Pendleton | July 5, 1910 |
| 1,074,624 | Jackson | Oct. 7, 1913 |
| 1,743,525 | Cabrera | Jan. 14, 1930 |
| 1,831,713 | Knowlton | Nov. 10, 1931 |
| 1,929,973 | Haley | Oct. 10, 1933 |
| 1,941,895 | Hennings | Jan. 2, 1934 |
| 1,980,761 | Mock et al. | Nov. 13, 1934 |
| 2,051,307 | Lorraine | Aug. 18, 1936 |
| 2,067,335 | Pardee | Jan. 12, 1937 |
| 2,252,883 | Everson | Aug. 19, 1941 |
| 2,313,889 | Porter | Mar. 16, 1943 |
| 2,327,805 | Koehring | Aug. 24, 1943 |